Figure 1:
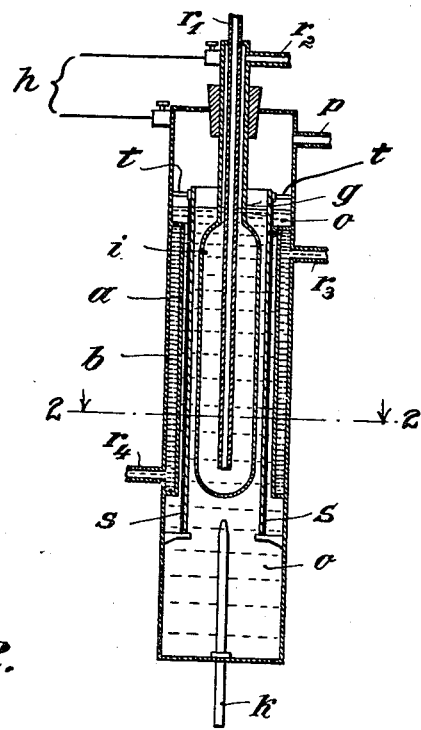

April 9, 1929.  W. ESMARCH  1,708,126
METHOD FOR THE TREATMENT OF HYDROCARBONS, ESPECIALLY
OILS BY MEANS OF CORONA ARC DISCHARGES
Filed March 28, 1925

Inventor
Wilhelm Esmarch
by Knight Bro
attorneys

Patented Apr. 9, 1929.

1,708,126

UNITED STATES PATENT OFFICE.

WILHELM ESMARCH, OF BERLIN-CHARLOTTENBURG, GERMANY, ASSIGNOR TO SIEMENS & HALSKE, AKTIENGESELLSCHAFT, OF SIEMENSSTADT, NEAR BERLIN, A CORPORATION OF GERMANY.

METHOD FOR THE TREATMENT OF HYDROCARBONS, ESPECIALLY OILS BY MEANS OF CORONA ARC DISCHARGES.

Application filed March 28, 1925, Serial No. 19,187, and in Germany April 14, 1924.

In the methods hitherto known for the treatment of hydrocarbons especially oils in gaseous mediums by means of electrical corona arc discharges, alternating current of low-frequency up to about 500 periods per second was used. However, on account of the great quantities of material to be treated the dimensions of the apparatus become extraordinary great. Further, the duration of the treatment is very long, which is a disadvantage in itself and which also leads to other inconveniences.

According to my invention these drawbacks are avoided by employing high-frequency alternating current for producing the discharges. The treatment of the hydrocarbons by means of high-frequency-corona arc discharges, which serves principally for increasing the viscosity of oils to a substantial extent, comprises the following advantages over the low-frequency treatment.

1. The possibility of admitting very great amounts of energy into a proportionally small apparatus. Tests have shown that for instance a small glass tube apparatus at 500 periods and a voltage of 8000 volts could be charged with about 17—18 watts whereas the same apparatus already at 10,000 periods and 5400 volts took up 250 watts. By further increasing the voltage the apparatus could easily be loaded with 350 to 400 watts without risking a puncture.

2. An extraordinarily shortened time of treatment which at 10,000 periods is about twenty times shorter than at 500 periods.

3. On account of the short duration of the treatment losses of energy on account of unproductive work are diminished, so for instance, the energy consumed by the air pump by means of which the pressure of the gaseous medium is lowered.

4. Of essential importance is also the fact that when high frequency is used, in cases in which the gaseous medium does not partake chemically in the process, it is not necessary to introduce a gas as for instance, nitrogen or hydrogen into the apparatus, but simply air may be employed. Experiments have shown that on account of the short time of treating the oxygen of the introduced air will not exert any injurious influences in the oil, as for instance, resinifaction, formation of acids or similar undesired chemical changes.

In order to utilize the advantages of the high-frequency corona arc discharge the electrodes, and above all the solid dielectric between the electrodes, must be cooled permanently with water. The cooling device must be arranged in such a manner that a contact between the cooling water and the heated hydrocarbon is prevented, even if a breakage of the dielectric should occur. According to the invention this is obtained in a simple manner by surrounding the dielectric—which for instance may be a glass tube—with a hollow water-cooled metallic mantle, the inner wall of which is spaced from the glass tube by a narrow intermediate space.

Figure 2:
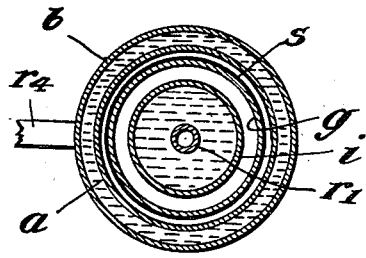

A constructional form of an apparatus for treating oil by means of corona-arc discharges is shown as an example in the accompanying drawing, in which Fig. 1 represents a central vertical section and Fig. 2 a transverse section on the line 2—2 in Fig. 1. The apparatus consists of a metallic container $b$ in which the water-cooled inner pole $i$ is arranged in isolated position. The second pole is formed by a hollow cylindrical and water-cooled body $a$, which is fastened to the container $b$. The cooling water for the inner and outer poles is admitted through the tubes $r_1$ $r_4$ respectively and removed through the tubes $r_2$ $r_3$ respectively. As a dielectric between the poles a glass cylinder $g$ is arranged in such a manner that it is situated at a relatively great distance from the inner pole which corresponds to the desired discharge process. The distance between the dielectric and the outer pole $a$ is only about 0,3—0,5 mm. Both poles are connected to a source of high frequency alternating current $h$. The container $b$ is evacuated by means of an air pump which is connected to the apparatus at $p$. In the bottom a capillary tube $k$ is arranged through which the air is introduced which is necessary for the treatment of the oil.

When the apparatus is to be operated the container $b$ is filled with oil $o$ through filler opening $p$ so that the poles are covered. Thereby the oil will also form a thin film of oil between the outer pole $a$ and the glass cylinder $g$. With this arrangement of the dielectric in relation to the poles, irregularities in the expansion of the adjacent parts will exert no injurious effects. On the other hand the transmission of heat from glass to metal is not interfered with so that the cooling is sufficiently effective. If a puncture through the glass should occur no water can pass over into the oil, because no water-containing space adjoins the glass.

In order to prevent the unmoved thin layer or film of oil between the glass cylinder $g$ and the outer cooling jacket $a$ from becoming solid and adhesive under the influence of the discharges, the outer surface of the glass cylinder $g$ is equipped with a layer of tin-foil which is conductively connected by stray bolts $t$ to the container $b$, which is conductively connected with the outer pole $a$ formed by the water jacket wall. The space between the glass cylinder and the cooling jacket thus remains free from discharges and the above mentioned drawbacks will be avoided.

What I claim as my invention and desire to secure by Letters Patent is:—

1. An apparatus for treating hydrocarbons, especially oil by means of electric corona arc discharges, comprising a source of high frequency alternating current, two electrodes connected to said source of current, an artificially cooled jacket at one of said electrodes, a dielectric arranged between said electrodes in such a manner that it is separated from said cooled electrode by a narrow intermediate space and from the other electrode by a substantially wider intermediate space.

2. An apparatus for treating hydrocarbons, especially oil by means of electric corona arc discharges, comprising a source of high frequency alternating current, a cylindrical container for the material to be treated, an inner hollow electrode, an outer electrode adjacent to the inner wall of said container, cooling devices for both of said electrodes, connecting means between said source of current and said electrodes, a dielectric arranged between said electrodes in such a manner that it is separated from said outer electrode by a narrow intermediate space and from the other electrode by a substantially wider intermediate space.

3. An apparatus for treating hydrocarbons, especially oil by means of electric corona arc discharges, comprising a source of high frequency alternating current, two electrodes connected to said source of current, an artificially cooled jacket at one of said electrodes, a dielectric arranged between said electrodes in such a manner that it is separated from said cooled electrode by a narrow intermediate space and from the other electrode by a substantially wider intermediate space, and a metallic layer arranged on the side opposing said cooled electrode and electrically connected to the same.

4. An apparatus for treating hydrocarbons, especially oil by means of electric corona arc discharges, comprising a source of high frequency alternating current, a cylindrical container for the material to be treated, an inner hollow electrode, an outer electrode adjacent to the inner wall of said container, cooling devices for both said electrodes, connecting means between said source of current and said electrodes, a dielectric arranged between said electrodes in such a manner that it is separated from said outer electrode by a narrow intermediate space and from the other electrode by a substantially wider intermediate space, and a capillary tube for admitting a predetermined amount of gas into the container.

5. A method for treating hydrocarbons, especially oil by exposing the hydrocarbon to be treated in fluid state, and in the presence of air and between closely adjacent surfaces formed by water cooled electrodes, to the influence of electrical corona-arc high frequency discharges which are produced by an alternating current of about 10,000 periods.

In testimony whereof I affix my signature.

WILHELM ESMARCH.